(12) United States Patent
Hiramatsu et al.

(10) Patent No.: US 8,093,779 B2
(45) Date of Patent: Jan. 10, 2012

(54) CONCENTRATED WINDING COIL AND METHOD OF MANUFACTURING SAME

(75) Inventors: Hiromichi Hiramatsu, Yokohama (JP); Takashi Ishigami, Hitachinaka (JP); Takashi Naganawa, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 203 days.

(21) Appl. No.: 11/954,305

(22) Filed: Dec. 12, 2007

(65) Prior Publication Data

US 2008/0136286 A1 Jun. 12, 2008

(30) Foreign Application Priority Data

Dec. 12, 2006 (JP) ................................. 2006-333942

(51) Int. Cl.
*H02K 3/46* (2006.01)

(52) U.S. Cl. ........................................ 310/208; 310/194

(58) Field of Classification Search .................. 310/194, 310/201–208, 71; 336/189, 222; 242/430
See application file for complete search history.

(56) References Cited

U.S. PATENT DOCUMENTS

| | | | | |
|---|---|---|---|---|
| 1,504,005 A | * | 8/1924 | Vienneau | 242/447.2 |
| 2,930,014 A | * | 3/1960 | Van Der Hoek et al. | 336/190 |
| 4,794,361 A | * | 12/1988 | Young | 336/189 |
| 5,174,013 A | * | 12/1992 | Hiroshima et al. | 29/605 |
| 6,621,190 B1 | * | 9/2003 | Asao et al. | 310/263 |
| 7,053,515 B2 | * | 5/2006 | Nakanishi et al. | 310/194 |
| 7,166,949 B2 | * | 1/2007 | Okada et al. | 310/194 |
| 2004/0245882 A1 | * | 12/2004 | Horie et al. | 310/194 |
| 2005/0029891 A1 | * | 2/2005 | Okada et al. | 310/194 |
| 2006/0033395 A1 | * | 2/2006 | Izumi et al. | 310/208 |

FOREIGN PATENT DOCUMENTS

| | | |
|---|---|---|
| GB | 1044081 | 9/1966 |
| JP | 61-254049 | 11/1986 |
| JP | 63-222412 | 9/1988 |
| JP | 2000-166193 | 6/2000 |
| JP | 2003-244906 | 8/2003 |

OTHER PUBLICATIONS

Office Action issued in Chinese Patent Application No. 200710196945.5 on Jan. 29, 2010.
Office Action issued in Chinese Patent Application No. 200710196945.5 on Aug. 13, 2010.

* cited by examiner

*Primary Examiner* — Dang D Le

(74) *Attorney, Agent, or Firm* — Antonelli, Terry, Stout & Kraus, LLP.

(57) ABSTRACT

A concentrated winding coil includes a plurality of coil layers each of which comprises a plurality of wire turns wound in alignment winding; and a bobbin including an inner flange, an outer flange and a bobbin body on which the wire is wound, wherein: each of the coil layers includes a turn shift portion where the wire is shifted from an n-th turn to an (n+1)-th turn; the turn shift portion is located only on a side of a coil end section of the coil; and the bobbin body has no guide grooves. A method of manufacturing the concentrated winding coil includes steps of: winding the wire on the bobbin; and pressing the wire by a wire guiding/holding member toward the inner flange or toward the outer flange.

11 Claims, 12 Drawing Sheets

TOP VIEW OF BOBBIN

CROSS SECTIONAL VIEW OF BOBBIN CUTTING ALONG A-A LINE

BOBBIN

FIRST COIL LAYER

SECOND COIL LAYER

THIRD COIL LAYER

TOP VIEW

SIDE VIEW

TOP VIEW

SIDE VIEW

BOBBIN

FIRST COIL LAYER

SECOND COIL LAYER

THIRD COIL LAYER

BOBBIN

FIRST COIL LAYER

SECOND COIL LAYER

THIRD COIL LAYER

CONCENTRATED WINDING COIL AND METHOD OF MANUFACTURING SAME

CLAIM OF PRIORITY

The present application claims priority from Japanese application serial no. 2006-333942 filed on Dec. 12, 2006, the content of which is hereby incorporated by reference into this application.

BACKGROUND OF THE INVENTION

1. Field of the Invention

The present invention relates to a concentrated winding coil for use in an electric motor for example. Furthermore, this invention relates to a method of manufacturing the concentrated winding coils.

2. Description of Related Art

In a stator, comprising a core and a winding wire, used for various kinds of electric motors, winding density of the wire has been required to increase in order to pursue high efficiency of the electric motor.

FIG. 1 is a schematic illustration showing top and side views of a conventional concentrated winding coil disposed in a core. FIG. 1 shows a positional relationship between a coiled bobbin 10 and a core 5, wherein a wire 2 is wound around a bobbin 1 in the core 5. As shown in the top view, in order to dispose the coiled bobbin 10 closely adjacent to the core 5 that is arranged circular in the final assembly, the circumferential length of the bobbin's outer flange 1-*b* is longer than that of the bobbin's inner flange 1-*c*. Also, as shown in the side view, the coiled bobbin 10 includes a coil slot section 10*a* located inside the core 5 and a coil end section 10*b* located outside the core 5. Since the coil slot section 10*a* located inside the core 5 greatly influences characteristics of an electric motor, the coil slot is a rectangle shape having a long side on the coil slot section 10*a* side and a short side on the coil end section 10*b* side as shown in the cross sectional view of FIG. 2.

FIG. 2 is a schematic illustration showing a top view and a cross sectional view cutting along A-A line in the top view of an example of a conventional bobbin 1 used for a concentrated winding coil. The outer flange 1-*b* and the inner flange 1-*c* are configured respectively on each side of the bobbin body 1-*a*, around which a wire 2 is wound, so as to prevent the wire 2 from removing from the bobbin body 1-*a*. As shown in the cross sectional view, an R (round) portion is provided on each of the four corners of the bobbin body 1-*a*. The radius of the R portion is usually determined according to the flexibility of the wire 2 and the strength of coating layer (insulator) of the wire 2.

By referring to FIGS. 3 through 6, problems will be explained, which occur when a wire is wound around the above-mentioned bobbin 1. FIG. 3 is a model drawing for explaining the winding problem. Herein, side A and side C are of the coil slot section, side B and side D are of the coil end section, and a terminal wire is pulled out in the direction of side D. For purposes of simplifying, each side is drawn with the same length. The winding method is: a wire is wound around the bobbin by the rotation of the bobbin with regard to a wire nozzle (not shown).

FIG. 4 is a drawing for explaining a relationship between a wire position in a coil layer and a side of the bobbin. FIG. 4 shows the trajectory of the wire in the n-th turn and the (n+1)-th turn ("n" is a natural number) on each side of the bobbin when guiding of the wire 2 in the coil axis direction (expressed as "wire traverse") with a constant rate is provided in synchronization with a rotation angle of the bobbin. Basically, in alignment winding, the wire 2 of the (n+1)-th turn is wound in close contact with the previous turn (n-th turn) not to have a gap therebetween in order to increase the winding density. In this case, however, useless space inevitably generates at a start and an end portions of the coil layer since the wire is wound in a regular helical form. Specifically, there are problems in that the slot-fill rate (ratio of the total wiring area to the winding space) decreases in the coil slot section on side A and side C, thereby affecting (degrading) the characteristics of the electric motor.

Accordingly, in order to solve the above problems, a method of guiding the wire 2 in the coil layer has been presented. FIG. 5 is a drawing for explaining another relationship between a wire position in a coil layer and a side of the bobbin. As shown in FIG. 5, this is a method in which wire traverse is not executed between side A and side C but is executed only on side D, thereby increasing the slot-fill rate in the coil slot section on side A and side C.

FIG. 6 is an explanatory drawing that shows an actual winding state with occurrence of a wire drifting. As shown by the broken line in the drawing, when wire traverse from side A through side C is set at 0 and wire traverse of the same quantity as a winding pitch is applied only on side D, an actual trajectory of the wire is prone to be as shown by the solid line. This is because the wire 2 is wound around the bobbin 1 while the wire is being pulled, and as shown in a cross sectional view of FIG. 2, this is also because the wire 2 tends to slip due to the R portion located on four corners of the bobbin body 1-*a*. Then, a component force of the tension is applied to the wire 2 so that the shortest distance is taken. Consequently, disturbance in wire alignment (e.g., a wire drifting) occurs only on side C, or in the range from side C to side B, or from side C to side A.

To solve the above problems, as described in JP-A-2003-244906, a method has been proposed in which a pair of wire guides called "former" are disposed on the outer circumference of the winding bobbin, and a wire is put through the guides and is wound around the winding bobbin. In this method, the former is approximated to the bobbin's flanges and is moved from the inner flange to the outer flange with winding the wire, thereby increasing the accuracy of positioning the wire on the winding bobbin.

FIG. 7 is a schematic illustration showing cross sectional views at a slot portion of another example of a conventional bobbin and a concentrated winding coil wound on the bobbin in which a process of wire winding until the third coil layer is illustrated. As shown in FIG. 7, a bobbin 1 has grooves that correspond to the wire pitch on the bobbin body 1-*a*. By applying a wire guide method, shown in FIG. 5, when a wire 2 is wound around the bobbin along the grooves, it is possible to ensure a good alignment on the side that is incorporated into the core slot. This is made possible because the grooves of the bobbin body 1-*a* prevent the drifting that disturbs the wire alignment as shown in FIG. 6. On the first coil layer of winding, drifting of the wire is inhibited by the grooves of the bobbin body 1-*a*, and on the second and after coil layers, the wound wire on the previous coil layer achieves the same function as grooves.

However, there are problems about the grooved bobbin, shown in FIG. 7, in that die manufacture cost is high. That is because antitype grooves must be created on a die, e.g., when the bobbin is made by a plastic molding. In addition, die alteration cost is generated when design conditions, such as a wire diameter, wire shape, shape of the bobbin, etc., are changed because the shape of grooves and a groove pitch are prescribed on the die.

On the other hand, in the method according to JP-A-2003-244906, because a wire is guided from outside of the bobbin, previously mentioned disturbance (the wire drifting) in wire alignment is prone to occur, causing a problem in accuracy.

SUMMARY OF THE INVENTION

Under these circumstances, the present invention is originated to solve the above problems. It is an object of the present invention to provide a concentrated winding coil having a high slot-fill rate, which prevents the occurrence of disturbance in wire alignment and contributes to increasing the efficiency of the electric motor and reducing the size of an electric motor. Furthermore, it is another object of the present invention to provide a method of manufacturing said concentrated winding coil without increasing bobbin die costs.

(1) According to one aspect of the present invention, a concentrated winding coil comprises: a plurality of coil layers each of which comprises a plurality of wire turns wound in alignment winding; and a bobbin comprising an inner flange, an outer flange and a bobbin body on which the wire is wound, wherein: each of the coil layers includes a turn shift section where the wire is shifted from an n-th turn to an (n+1)-th turn ("n" is a natural number); the turn shift section is located only on a side of a coil end section of the coil; and the bobbin body has no guide grooves.

In the above invention (1), the following modifications and changes can be made.

(i) The concentrated winding coil further comprises a layer shift section where the wire is shifted from an m-th coil layer to an (m+1)-th coil layer ("m" is a natural number); and the layer shift section is located only on the coil end side of the coil.

(ii) An electrical rotating machine comprises said concentrated winding coil.

(iii) The wire is a round wire or a rectangular wire.

(iv) A clearance between a length of the bobbin body in a coil axis direction and a length of the coil layer in the same direction is shorter than a width of the wire. (In other words, a length of the bobbin body in a coil axis direction is not smaller than integer multiple of a width of the wire.)

(v) A number of turns on each coil layer is not the same.

(vi) Said side is one side which is located on the coil end section of the bobbin.

(vii) In the same half part on the coil end side viewed from the coil end are positioned an end-of-winding wire, a terminal wire latch portion for the end-of-winding wire, and a leading portion of the end-of-winding wire to the terminal wire latch portion.

(viii) Wires of a second and after coil layers of the coil are located just right on the wires of a first coil layer.

(2) According to another aspect of the present invention, a method of manufacturing a concentrated winding coil in which a wire is wound on a bobbin having an inner flange, an outer flange and a bobbin body, comprises steps of: winding the wire on the bobbin; and pressing the wire by a wire guiding/holding member toward the inner flange or toward the outer flange.

(3) According to another aspect of the present invention, a method of manufacturing a concentrated winding coil in which a wire is wound on a bobbin, wherein a position of the wire is adjusted inside the bobbin by a wire guiding/holding member.

In the above inventions (2) and (3), the following modifications and changes can be made.

(ix) During the step of winding the wire on the bobbin, the wire guiding/holding member stands ready at a position away from the wire.

(x) The method of manufacturing a concentrated winding coil further comprises a step of pressing the wire toward the bobbin body by the wire guiding/holding member.

(xi) The wire is a round wire or a rectangular wire.

(xii) The "inside the bobbin" means a space around the bobbin body and between the inner flange and the outer one.

ADVANTAGES OF THE INVENTION

The present invention provides a concentrated winding coil having a high slot-fill rate, which can prevent the occurrence of disturbance in wire alignment and contribute to increasing the efficiency of the electric motor and reducing the size of an electric motor. Furthermore, the present invention provides a method of manufacturing said concentrated winding coil without increasing bobbin die manufacture costs.

DETAILED DESCRIPTION OF THE PREFERRED EMBODIMENTS

Preferred embodiments according to the present invention will be described bellow with reference to the accompanying drawings. However, the present invention is not limited to the embodiments described herein.

First Embodiment of the Invention

With reference to FIGS. 8(a) to 8(g), description will be provided about winding the first coil layer adjacent to the bobbin body by a winding method according to the present invention. One of essential points of the present invention is the positional relationship among a wire guiding/holding member, a wire and a bobbin during the winding; therefore, description of other parts will be omitted. FIGS. 8(a) to 8(g) are schematic illustrations showing top views of a concentrated winding coil for explaining a winding method according to the present invention.

Figure 8A:
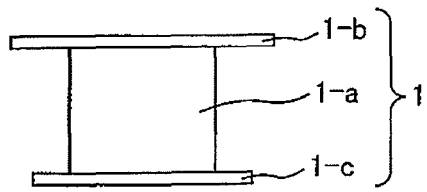
FIGS. 8(a) to 8(g) are schematic illustrations showing top views of a concentrated winding coil for explaining a winding method according to the present invention.

FIG. 8(a) shows a bobbin 1 before a wire is wound around. The bobbin 1 comprises: a bobbin body 1-a on which a wire 2 is wound and which has no guide grooves; an outer flange 1-b which prevents a wire 2 from removing and is located on the outer circumference when the bobbin 1 is disposed in the core 5; and an inner flange 1-c which also prevents a wire 2 from removing and is located on the inner circumference when the bobbin 1 is disposed in the core 5.

Figure 8E:
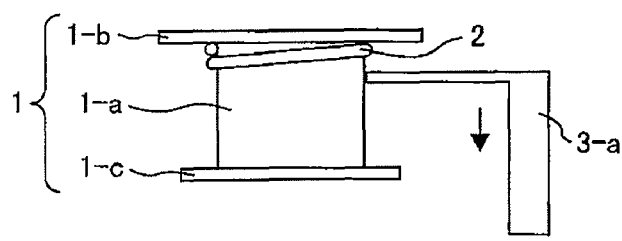
Figure 8B:
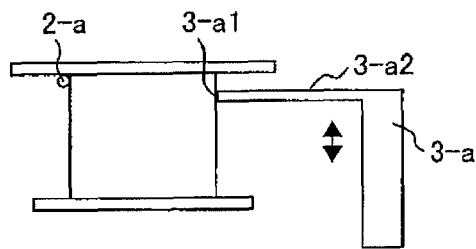

FIG. 8(b) shows a state in which a start-of-winding wire 2-a is positioned on the bobbin 1. In this drawing, winding is started while a wire is adjacent to the outer flange 1-b and is located on the left side of the bobbin body 1-a; however, winding can be started from other positions depending on the location of the terminal wire or on the coil winding direction.

The position of the wire guiding/holding member of front side 3-a will be explained when the start-of-winding wire 2-a is positioned on the bobbin 1. The wire guiding/holding portion of front side 3-a is disposed on a winding spindle around which the bobbin 1 rotates, thereby the wire guiding/holding member of front side 3-a rotates along with the bobbin 1. That is, it is not necessary to position the mechanism on the outer circumference portion separate from the winding spindle. As a result, it is possible to inhibit the decrease in rotation rate of the winding spindle; and the mechanical structure allows the wire guiding/holding member of front side 3-a to press and hold the wire 2 while the winding spindle rotates (described later in detail).

The wire guiding/holding member of front side 3-a comprises an end portion 3-a1 which faces the bobbin body 1-a, and a wire contact portion 3-a2 which guides a wire 2 when winding is executed. A surface of the wire contact portion 3-a2 comes in contact with a wire 2 while the wire is being wound and also comes in contact with the wire 2 in order to press the wire 2 (to adjust a wire alignment) after the wire 2 has reached the bobbin body 1-a. For this reason, it is desirable that the surface roughness of the wire contact portion 3-a2 be small by means of finish such as polishing.

The distance between the end portion 3-a1 of the wire guiding/holding member of front side 3-a and the bobbin body 1-a has to be determined so that the wire 2 is prevented from entering the space and also the end portion 3-a1 is not in contact with the bobbin body 1-a. Actually, when the diameter or height of the wire 2 is d, the distance between the end portion 3-a1 of the wire guiding/holding member of front side 3-a and the bobbin body 1-a can be set within a range of 0.1 d and 0.5 d to satisfy the above-mentioned conditions.

The wire contact portion 3-a2 of the wire guiding/holding portion of front side 3-a is positioned at a distance within a range of 1.1 d and 2 d to the outer flange 1-b when a wire 2 does not exist between the wire contact portion 3-a2 and the outer flange 1-b, or to the most recently wound wire when a wire 2 exists and winding progresses. By setting the distance at that value, it is easy to guide the wire 2 when the wire is wound.

Figure 8F:
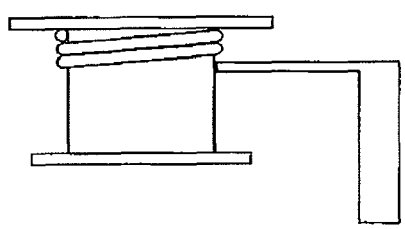
Figure 8C:
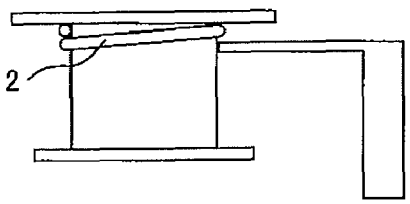

FIG. 8(c) shows a state in which the winding progresses for a prescribed angle rotation from the state in FIG. 8(b) As shown in FIG. 8(c), the position of the wire contact portion 3-a2 of the wire guiding/holding member of front side 3-a has a clearance with regard to the diameter [d] of the wire 2; therefore, it is possible to wind a wire without interference when the wire 2 is dropped onto the bobbin body 1-a.

Figure 8G:
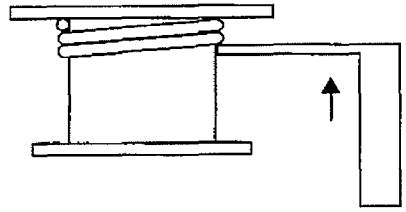
Figure 8D:
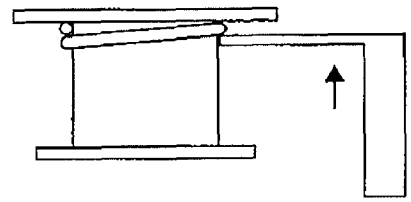

FIG. 8(d) shows a state in which the wire is pressed (is adjusted) toward the outer flange 1-b by the wire contact portion 3-a2. The wire contact portion 3-a2 of the wire guiding/holding member of front side 3-a comes in contact with the wire 2 and presses the wire 2 toward the outer flange 1-b by a pressing mechanism, not shown, thereby making the wire 2 come in contact with the outer flange 1-b, and ensuring the wire alignment inside the bobbin 1. An optimal value for a pressing force should be selected according to the conditions, such as a diameter of a wire, flexibility of a wire, and wire tension while the wire is wound.

FIG. 8(e) shows a state in which the winding further progresses when compared to the state shown in FIG. 8(d) and the wire contact portion 3-a2 of the wire guiding/holding member of front side 3-a is released from the wire 2 before the following turn of wire 2 is wound around. In this state, the position of the wire guiding/holding member of front side 3-a will be explained. The distance between the end portion 3-a1 of the wire guiding/holding member of front side 3-a and the bobbin body 1-a has to be determined so that the wire 2 is prevented from entering the space and also the end portion 3-a1 is not in contact with the bobbin body 1-a. Actually, when the diameter or height of the wire 2 is d, the distance between the end portion 3-a1 of the wire guiding/holding member of front side 3-a and the bobbin body 1-a can be set within a range of 0.1 d and 0.5 d to satisfy the above-mentioned conditions. The wire contact portion 3-a2 of the wire guiding/holding member of front side 3-a is positioned at a distance within a range of 1.1 d and 2 d to the most recently wound wire. By changing the distance to that value, it is easy to guide the wire 2 when the wire is further wound.

Moreover, with regard to the timing at which the wire contact portion 3-a2 of the wire guiding/holding member of front side 3-a is released from the wire 2, by releasing the wire contact portion 3-a2 proximately before the wire 2 reaches the bobbin body 1-a in synchronization with the rotation angle of the winding, it is possible to minimize the disturbance in wire alignment.

FIG. 8(f) shows a state in which the winding further progresses for a prescribed angle rotation from the state in FIG. 8(e). As shown in FIG. 8(f), the position of the wire contact portion 3-a2 of the wire guiding/holding member of front side 3-a includes a clearance to the wire 2 to be wound with regard to the diameter [d] of the wire 2; therefore, it is possible to wind a wire without interference when the wire 2 is dropped onto the bobbin body 1-a.

FIG. 8(g) shows a state in which the wire is pressed (is adjusted) toward the outer flange 1-b by the wire contact portion 3-a2. The wire contact portion 3-a2 of the wire guiding/holding member of front side 3-a comes in contact with the wire 2 and presses the wire toward the outer flange 1-b by a pressing mechanism, not shown, thereby making the wire 2 come in contact with the most recently wound wire 2, and ensuring the wire alignment inside the bobbin 1. An optimal value for the pressing force should be selected according to the conditions, such as a diameter of a wire, flexibility of a wire, and wire tension while the wire is wound.

After that, operations shown in FIGS. 8(e) to 8(g) are repeated to continue winding the wire.

Figure 9:
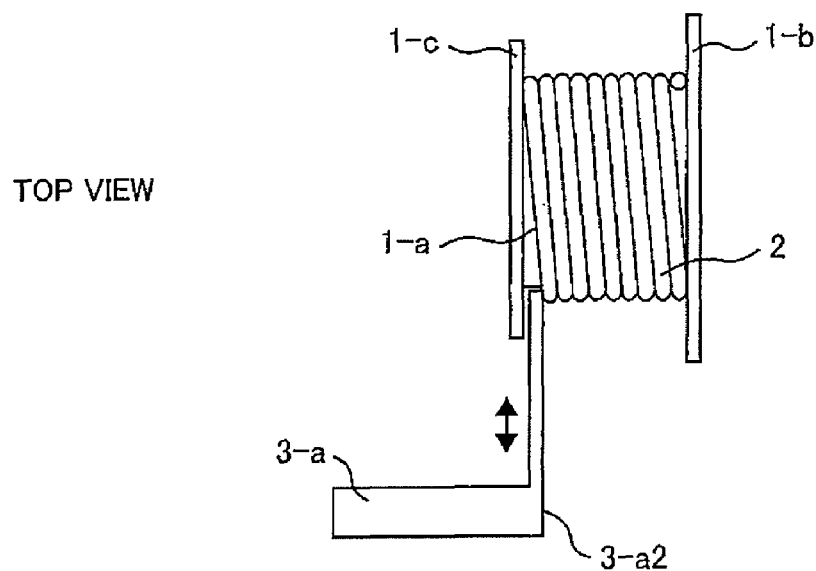
FIG. 9 is a schematic illustration showing top and side views of a concentrated winding coil according to the present invention, of which state is that winding of the first coil layer progresses proximately before the last turn of the first coil layer.
Figure 9:
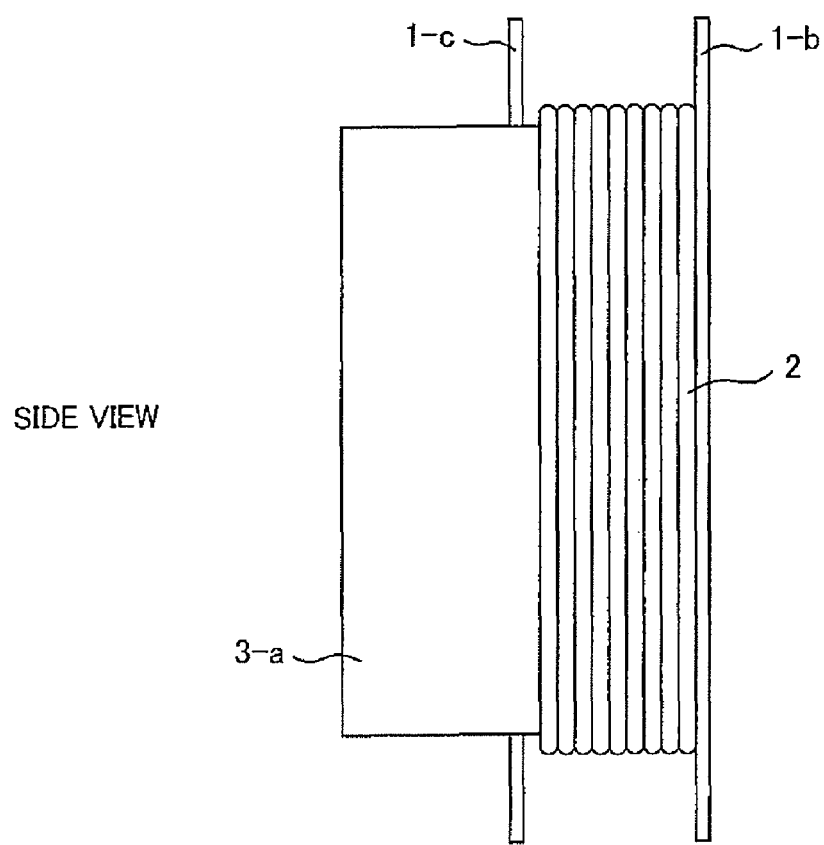

FIG. 9 is a schematic illustration showing top and side views of a concentrated winding coil according to the present invention, of which state is that winding of the first coil layer progresses proximately before the last turn of the first coil layer is dropped on the bobbin body 1-a. After the state in FIG. 9, when the last turn of the first coil layer is dropped on the bobbin body 1-a, the wire guiding/holding member of front side 3-a is retracted from a passage of the wire 2, and the last turn of the wire 2 of the first coil layer is positioned between the most recently wound wire 2 and the inner flange 1-c.

Figure 10A:
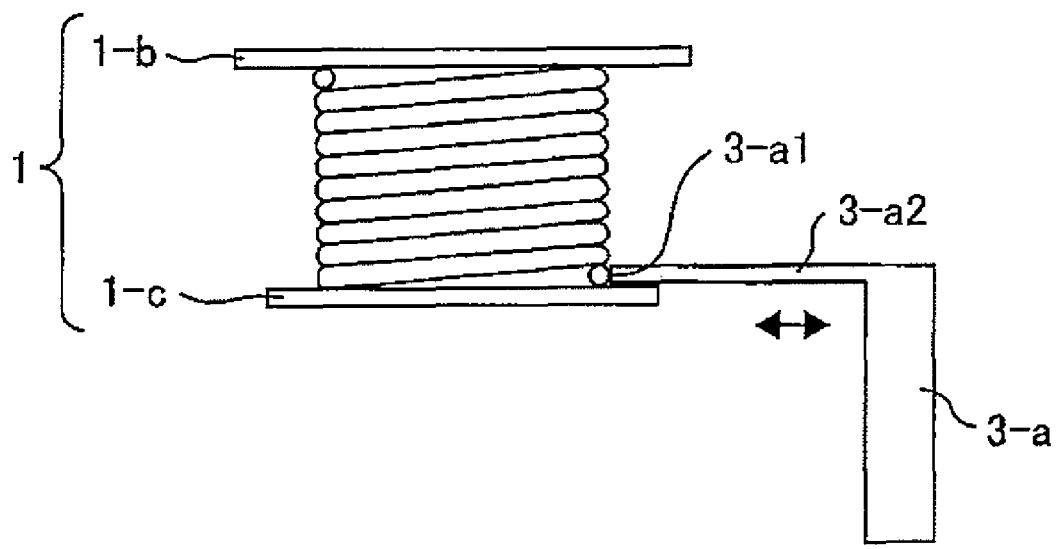
FIGS. 10(a) and 10(b) are schematic illustrations showing a top view of a coil with the first coil layer winding and that of the coil with the second coil layer winding respectively, for explaining a winding method according to the present invention.
Figure 10B:
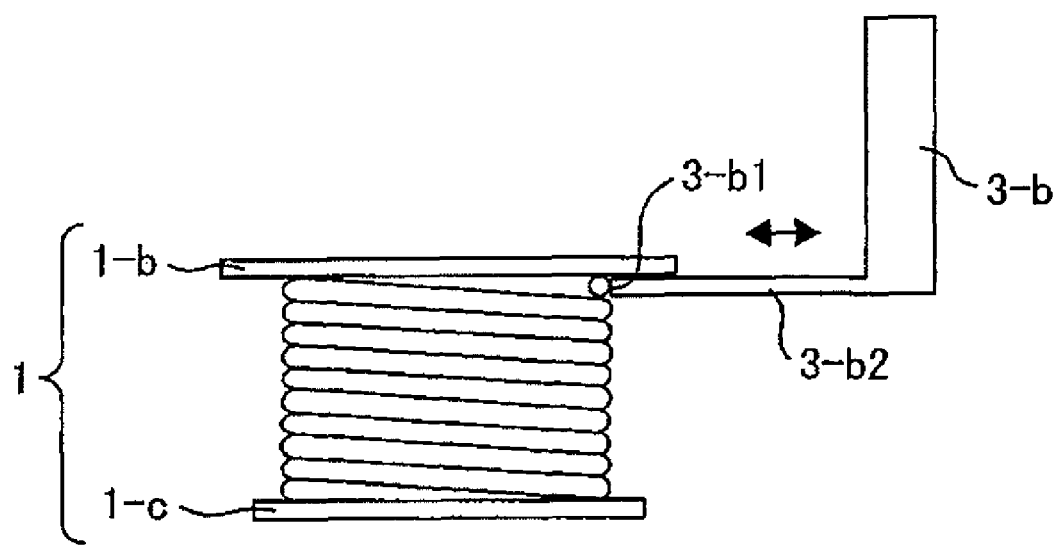

Space for the last turn of the first coil layer is ensured by pressing the wire 2 toward the outer flange 1-b in each turn. However, when the wire 2 does not reach the bobbin body 1-a due to a narrow space which resulted from uneven diameter of the wire 2 or uneven distance between the outer flange 1-b and the inner flange 1-c caused in the manufacturing process of the bobbin, the wire 2 can be reached the bobbin body 1-a by pressing the wire 2 toward the bobbin body 1-a by means of the end portion 3-a1 of the wire guiding/holding member of front side 3-a, as shown in FIG. 10(a). In this case, it is desirable that a surface of the end portion 3-a1 as well as the surface of the wire contact portion 3-a2 be polished so as to decrease the surface roughness. Besides, FIGS. 10(a) and 10(b) are schematic illustrations showing a top view of a coil with the first coil layer winding and that of the coil with the second coil layer winding respectively, for explaining a winding method according to the present invention.

The method of the second coil layer winding is almost the same as that of the first coil layer winding described by referring to FIGS. 8(a) to 8(g). The difference is: as shown in FIG. 10(b), a wire guiding/holding member of rear side 3-b is used, which is anteroposteriorly symmetrical with respect to the wire guiding/holding member of front side 3-a used for the first coil layer winding; and a direction of forming a coil layer is reverse, from the inner flange 1-c toward the outer flange 1-b.

Figure 11:
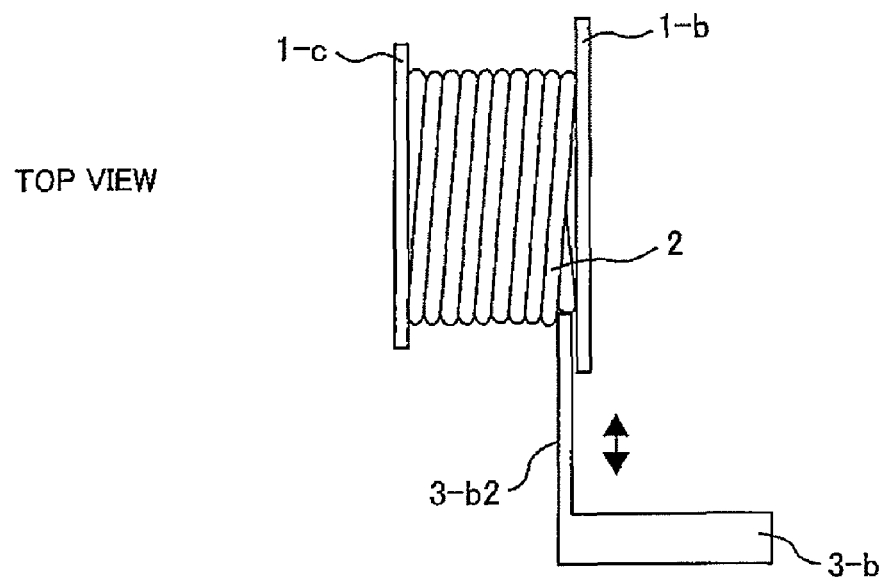
FIG. 11 is a schematic illustration showing top and side views of a concentrated winding coil according to the present invention, of which state is that winding of the second coil layer progresses proximately before the last turn of the second coil layer.
Figure 11:
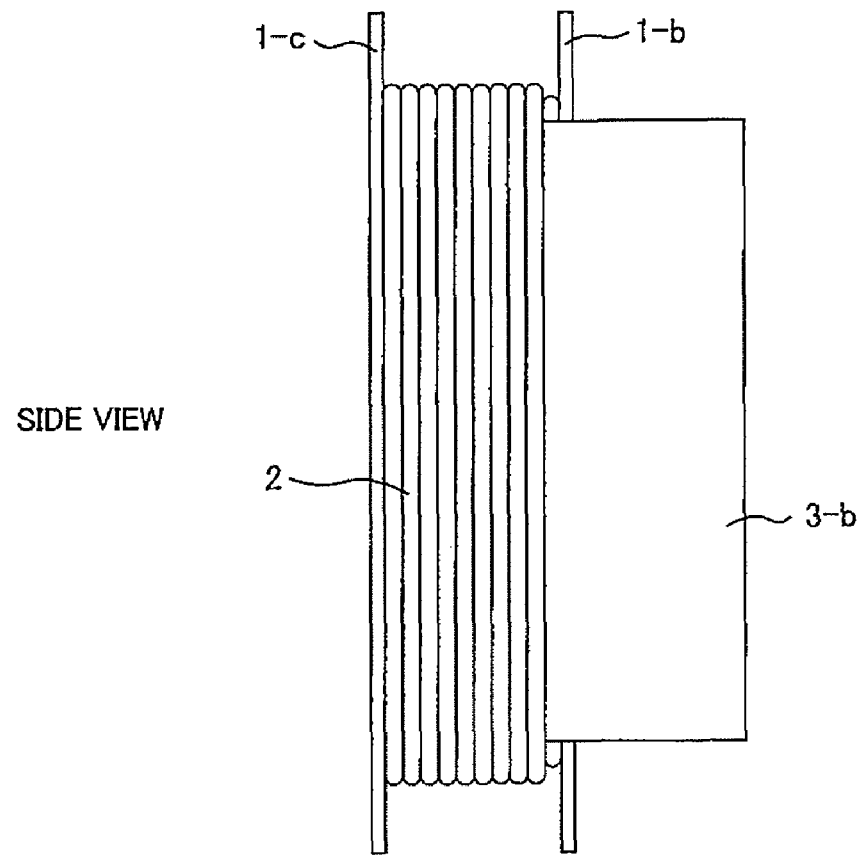

FIG. 11 is a schematic illustration showing top and side views of a concentrated winding coil according to the present invention, of which state is that winding of the second coil layer progresses proximately before the last turn of the second coil layer is dropped on the first coil layer toward the bobbin body 1-a. After the state of FIG. 11, when the last turn of the second coil layer is dropped on the first coil layer, the wire guiding/holding member of rear side 3-b is retracted from the passage of the wire 2, and the last turn of the second coil layer is positioned between the most recently wound wire 2 and the outer flange 1-b.

Space for the last turn of the second coil layer is ensured by pressing the wire 2 toward the inner flange 1-c in each turn. However, when the wire 2 does not reach the first coil layer due to a narrow space which resulted from uneven diameter of the wire 2 or uneven distance between the outer flange 1-b and the inner flange 1-c caused in the manufacturing process of the bobbin, the wire 2 can be reached the first coil layer by pressing the wire 2 toward the bobbin body 1-a (toward the first coil layer) by means of an end portion 3-b1 of the wire guiding/holding member of rear side 3-b, as shown in FIG. 10(b). In this case, it is desirable that a surface of the end portion 3-b1 as well as the surface of a wire contact portion 3-b2 be polished so as to decrease the surface roughness.

The method of winding an m-th coil layer is as follows ("m" is a natural number): to wind a wire for an odd-number-th coil layer, the wire guiding/holding member of front side 3-a is used in the same manner as the first coil layer and the winding of the odd-number coil layer progresses from the outer flange 1-b toward the inner flange 1-c; and to wind a wire for an even-number-th coil layer, the wire guiding/holding member of rear side 3-b is used in the same manner as the second coil layer and the winding of the even-number coil layer progresses from the inner flange 1-c toward the outer flange 1-b.

On the other hand, the disturbance in wire alignment is prone to occur in a layer shift section where the wire is shifted from an m-th coil layer to an (m+1)-th coil layer. Therefor, it is preferable that the layer shift section is located only on the coil end side of the coil. The situation can be easily achieved by the winding method of the present invention because a wire on the coil slot side is guided and held during the winding by the wire guiding/holding members in the pressing mechanism according to the present invention.

Herein, above description has been provided in the case that a wire is wound on an outer circumference of a bobbin body with making a coil layer and that a length of the coil layer in the coil axis direction is almost the same as a length of the bobbin body in the same direction. And the corresponding problems and solutions have been also described.

In a conventional winding method, the alignment winding of a coil is not sufficiently controlled; accordingly, a length of the bobbin body in the coil axis direction is often set to be enough longer than a prescribed length of the coil layer in the same direction. In that case, when a good alignment winding is executed, a number of turns in the coil layer becomes one turn more; and when a poor alignment winding is executed, the winding on upper coil layer becomes unsteady. These situations degrade the reliability of the coils and inhibit the increase in a slot-fill rate.

As shown in the present invention, by cohering the wires with each other in every turn using the pressing mechanism, it is possible to select design specifications in which a wire is wound around the outer circumference of the bobbin with forming a coil layer, and a clearance between a length of the bobbin body in the coil axis direction and a length of the coil layer in the same direction is shorter than the width of the wire. Consequently, a high slot-fill rate can be achieved as designed.

Furthermore, herein, the wire guiding/holding member of front side 3-a and the wire guiding/holding member of rear side 3-b which are a pair are located only one side of the coil slot section; however, according to the degree of disturbance in wire alignment caused depending on flexibility of the wire or winding tension, by disposing another pair of wire guiding/ holding members on the opposite side of the coil slot section, it is possible to further increase the effects of preventing the disturbance in wire alignment.

Figure 12:
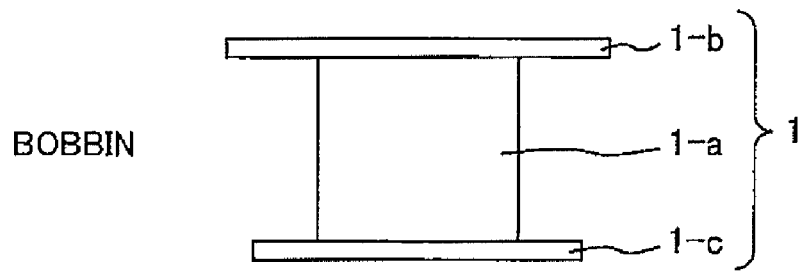
FIG. 12 is a schematic illustration showing cross sectional views at a slot portion of a bobbin and of a concentrated winding coil wound on the bobbin according to a first embodiment of the present invention, in which a progress of wire winding until the third coil layer is illustrated.
Figure 12:
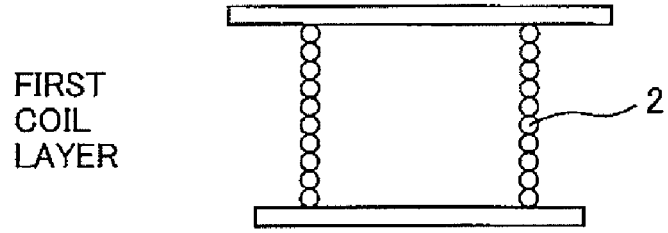
Figure 12:
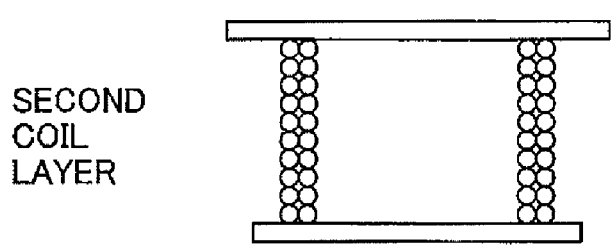
Figure 12:
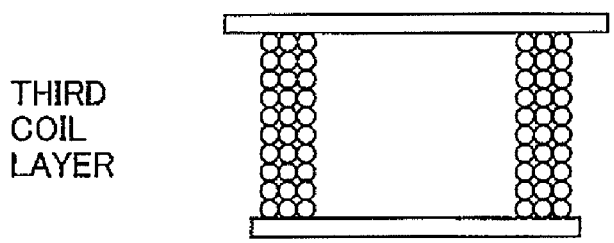

FIG. 12 is a schematic illustration showing cross sectional views at a slot portion of a bobbin and of a concentrated winding coil wound on the bobbin according to a first embodiment of the present invention, in which a progress of wire winding until the third coil layer is illustrated. As shown in FIG. 12, because the bobbin body 1-a has no grooves, it is possible to prevent the increase in production cost resulting from groove formation, and the design capability increases because it is easy to change design conditions, such as a diameter of a wire, shape of a wire, shape of a bobbin, and so on.

Figure 7:
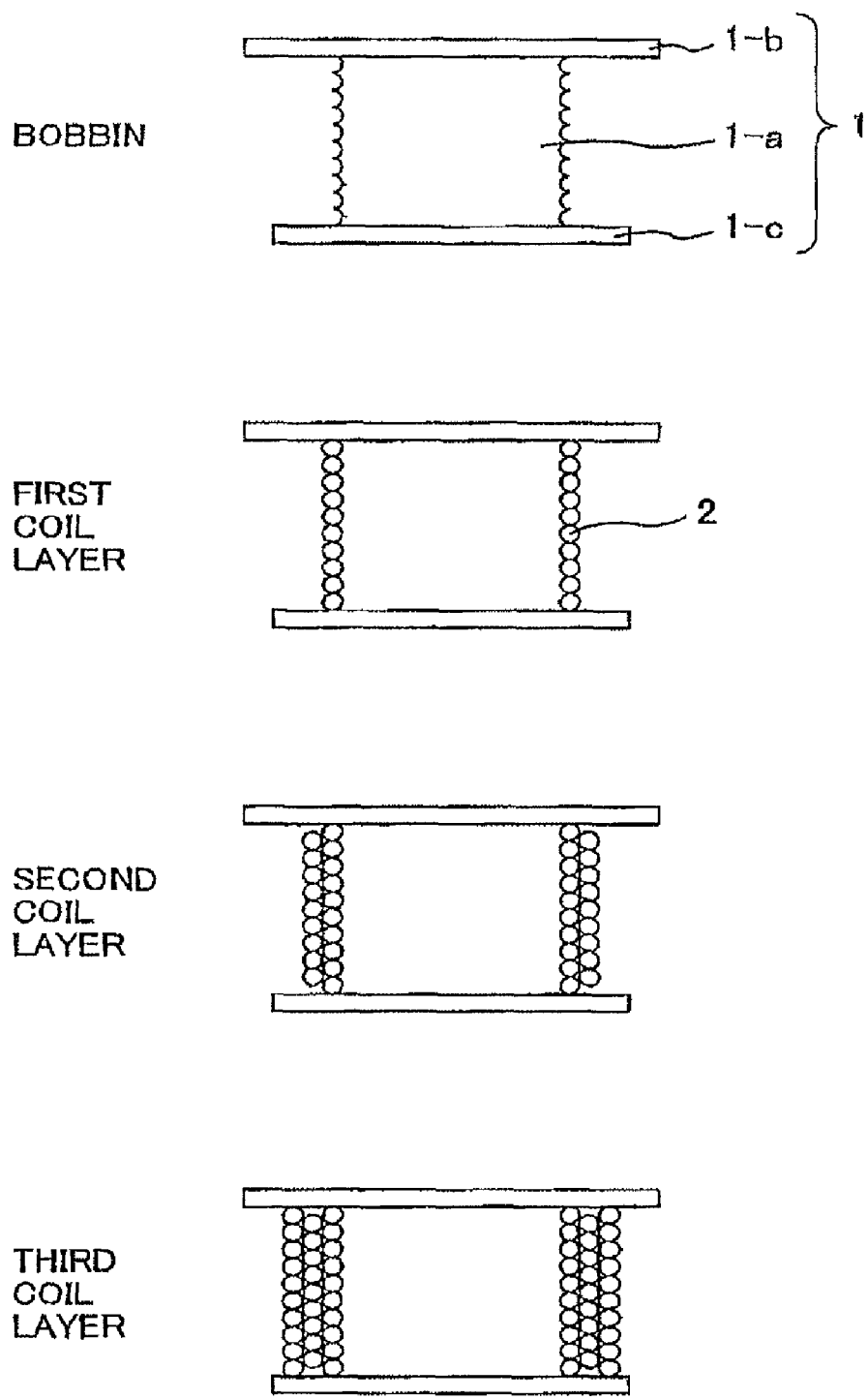
FIG. 7 is a schematic illustration showing cross sectional views at a slot portion of another example of a conventional bobbin and of a concentrated winding coil wound on the bobbin, in which a progress of wire winding until the third coil layer is illustrated.

In FIG. 12, wires of the second coil layer and the third coil layer are located just right on the wires of the first coil layer. This winding configuration cannot be achieved by a conventional winding method, but is possible by the winding method according to the present invention. Of course, the winding configuration as shown in FIG. 7 can be easily manufactured by the winding method of the present invention without using a grooved bobbin.

Second Embodiment of the Invention

Figure 13:
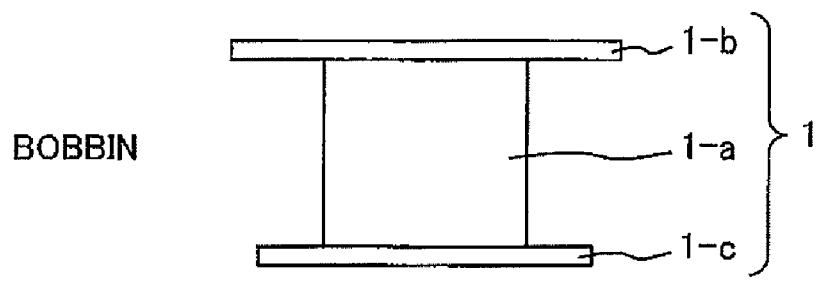
FIG. 13 is a schematic illustration showing cross sectional views at a slot portion of a bobbin and of a concentrated winding coil wound on the bobbin according to a second embodiment of the present invention, in which a progress of wire winding until the third coil layer is illustrated.
Figure 13:
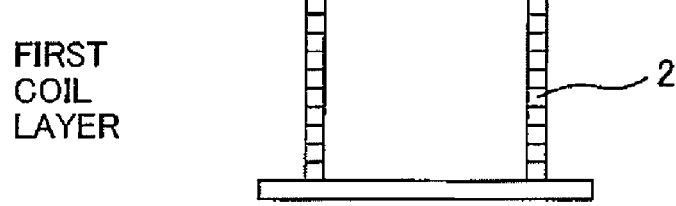
Figure 13:
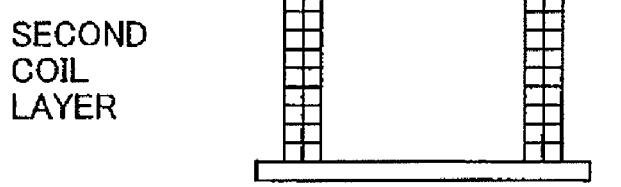
Figure 13:
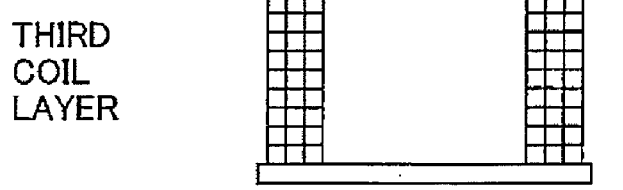

FIG. 13 is a schematic illustration showing cross sectional views at a slot portion of a bobbin and of a concentrated winding coil wound on the bobbin according to a second embodiment of the present invention, in which a progress of wire winding until the third coil layer is illustrated. Herein, instead of using a round wire as shown in FIG. 12, the wire 2 to be used is a rectangular (quadrate) wire. The rectangular wire is often used for an electric motor that requires a high slot-fill rate. By using a rectangular wire, it is possible to significantly eliminate clearance that generates between coil layers of round wire and between turns of round wire. The conventional bobbin, as shown in FIG. 7, has a guide groove that fits a round wire, however, it is difficult to prepare a bobbin with a guide groove that fits a rectangular wire, i.e., the guide grooves for the rectangular wire are not provided on the bobbin body 1-a. Thus, it can be said that the winding method according to the present invention must be needed in order to ensure the winding alignment of the rectangular wire 2 without providing guide grooves on the bobbin body 1-a.

Third Embodiment of the Invention

Figure 14:
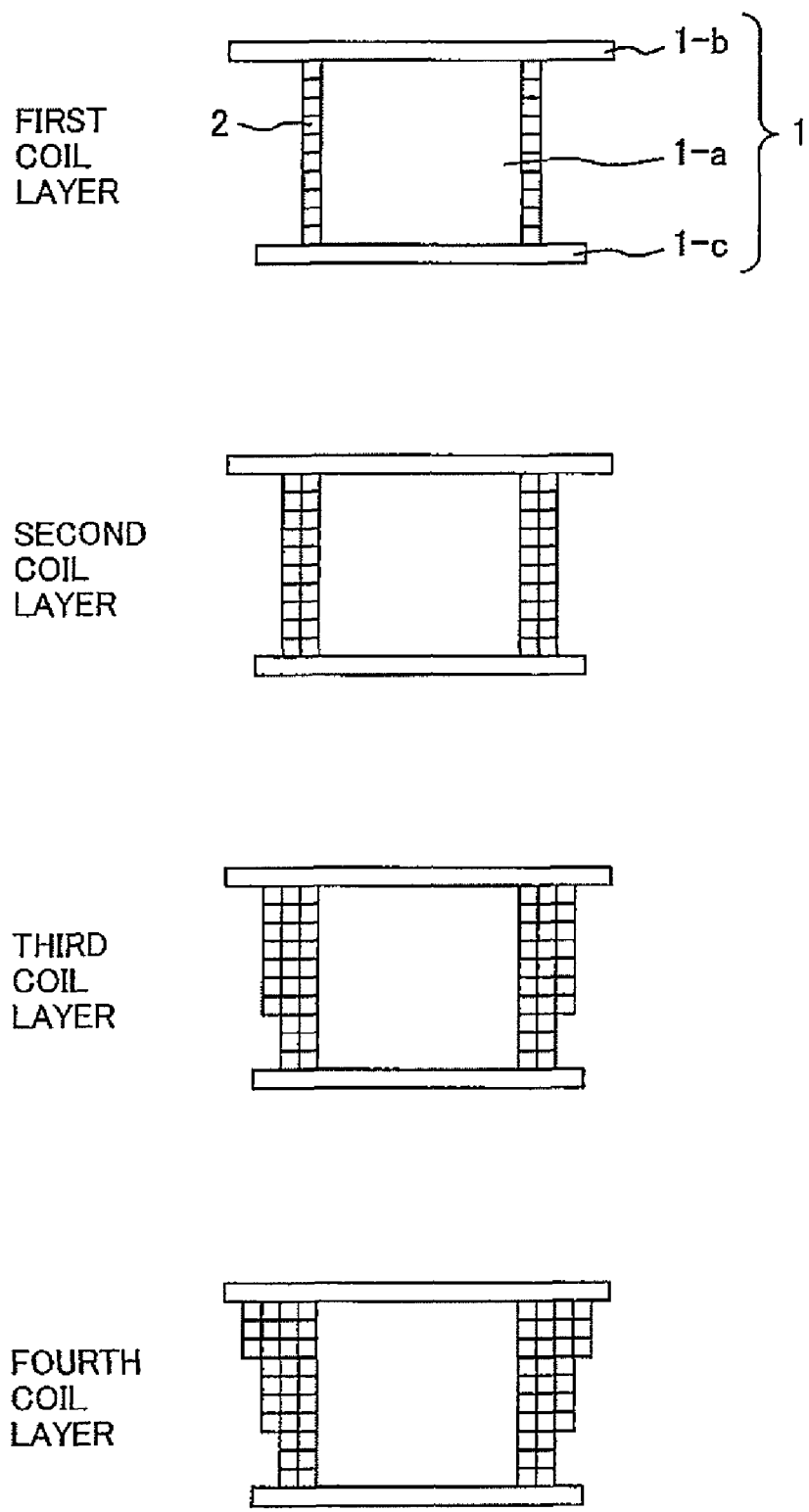
FIG. 14 is a schematic illustration showing cross sectional views at a slot portion of a concentrated winding coil wound on a bobbin according to a third embodiment of the present invention, in which a progress of wire winding until the fourth coil layer is illustrated.

FIG. 14 is a schematic illustration showing cross sectional views at a slot portion of a concentrated winding coil wound on a bobbin according to a third embodiment of the present invention, in which a progress of wire winding until the fourth coil layer is illustrated. As shown in FIG. 14, the concentrated winding coil in this embodiment has the coil layer in which the number of turns differs for each coil layer. The bobbin has almost the same bobbin body 1-a as those shown in FIGS. 12 and 13, which has no grooves. Therefore, an explanatory drawing is omitted.

Figure 1:
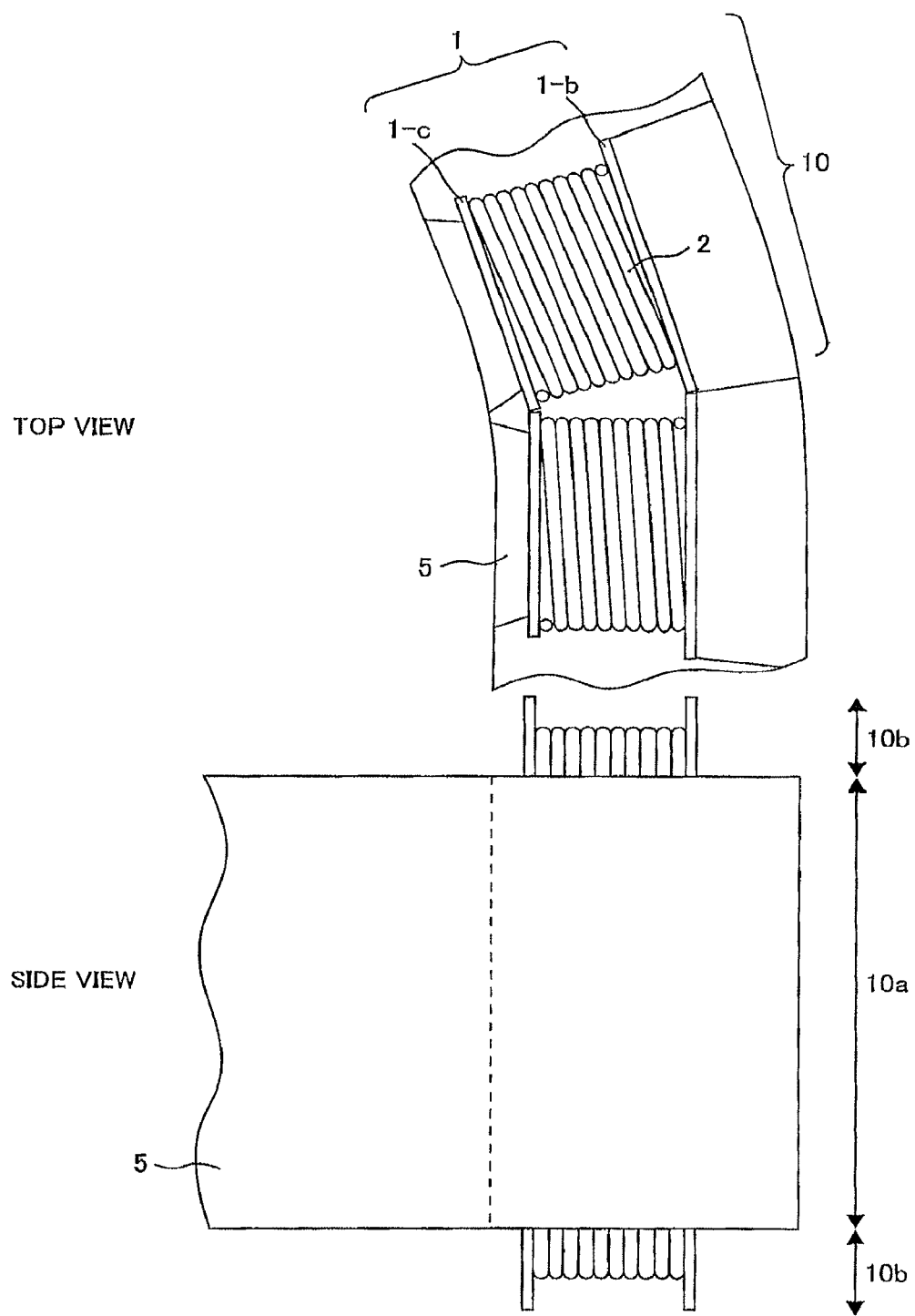
FIG. 1 is a schematic illustration showing top and side views of a conventional concentrated winding coil disposed in a core.
Figure 2:
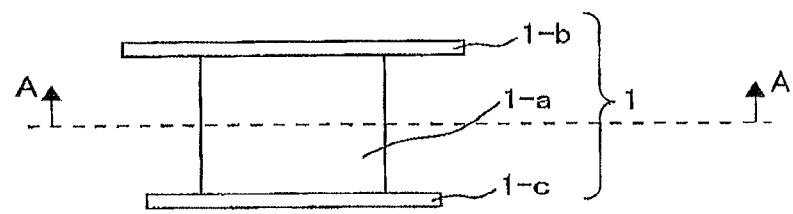
FIG. 2 is a schematic illustration showing a top view and a cross sectional view cutting along A-A line in the top view of an example of a conventional bobbin used for a concentrated winding coil.
Figure 2:
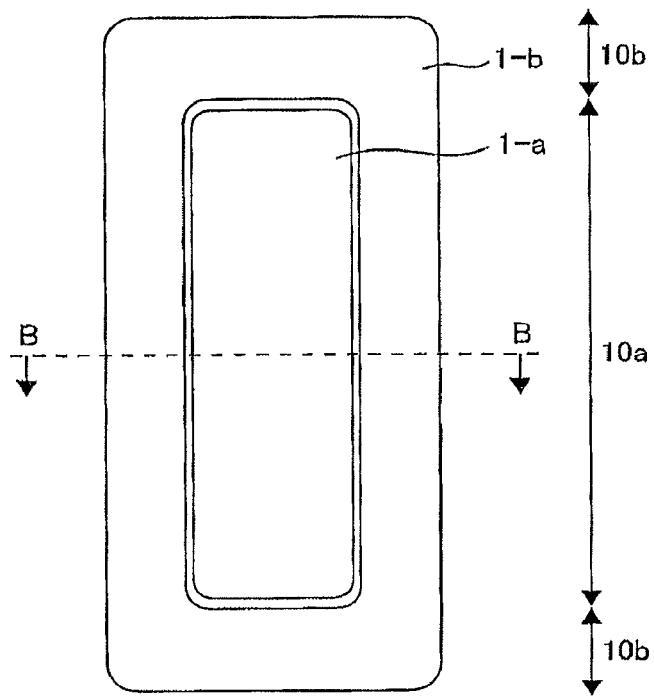
Figure 3:
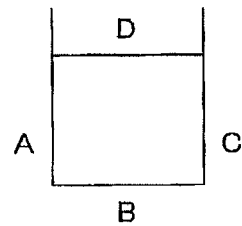
FIG. 3 is a model drawing for explaining the winding problem.
Figure 4:
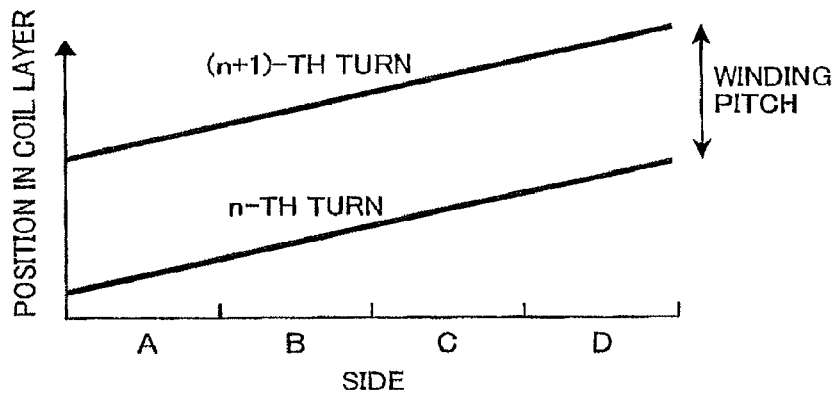
FIG. 4 is a drawing for explaining a relationship between a wire position in a coil layer and a side of the bobbin.
Figure 5:
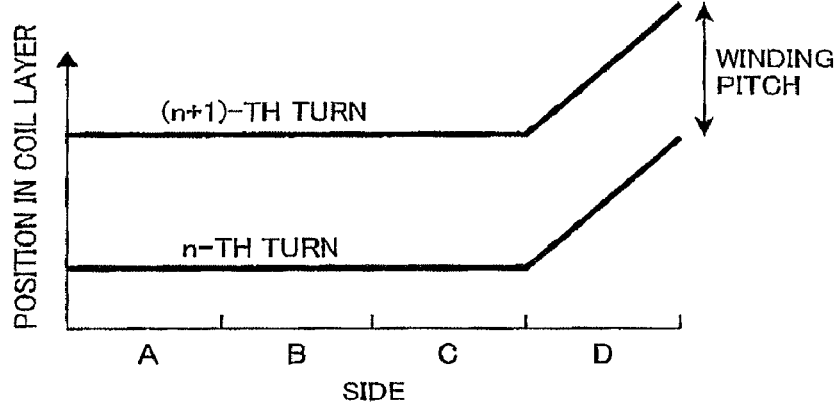
FIG. 5 is a drawing for explaining another relationship between a wire position in a coil layer and a side of the bobbin.
Figure 6:
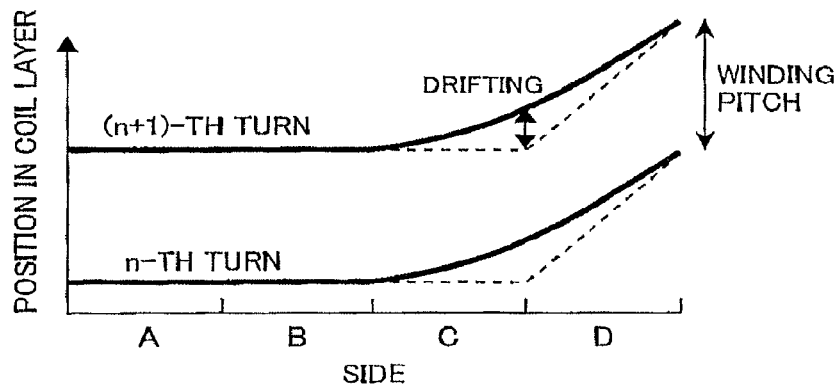
FIG. 6 is an explanatory drawing that shows an actual winding state with occurrence of a wire drifting.

The concentrated winding coil of this embodiment is intended to increase a slot-fill rate by decreasing a clearance between adjacent coils disposed in the core as shown in a top view of FIG. 1. Specifically, the number of turns close to the outer flange 1-b in the coil is increased.

In this embodiment, the winding is executed as follows: the maximum number of turns that can fit the length of the bobbin body 1-a in the coil axis direction (the distance between the inner flange 1-c and the outer flange 1-b) are wound as the first coil layer and the second coil layer, e.g.; a turned-back position is changed in the third coil layer; and a coil layer from which the winding is started is changed in the fourth coil layer. This process is made possible only by the winding method according to the present invention in which a wire 2 is guided and held after the winding.

Fourth Embodiment of the Invention

Figure 15:
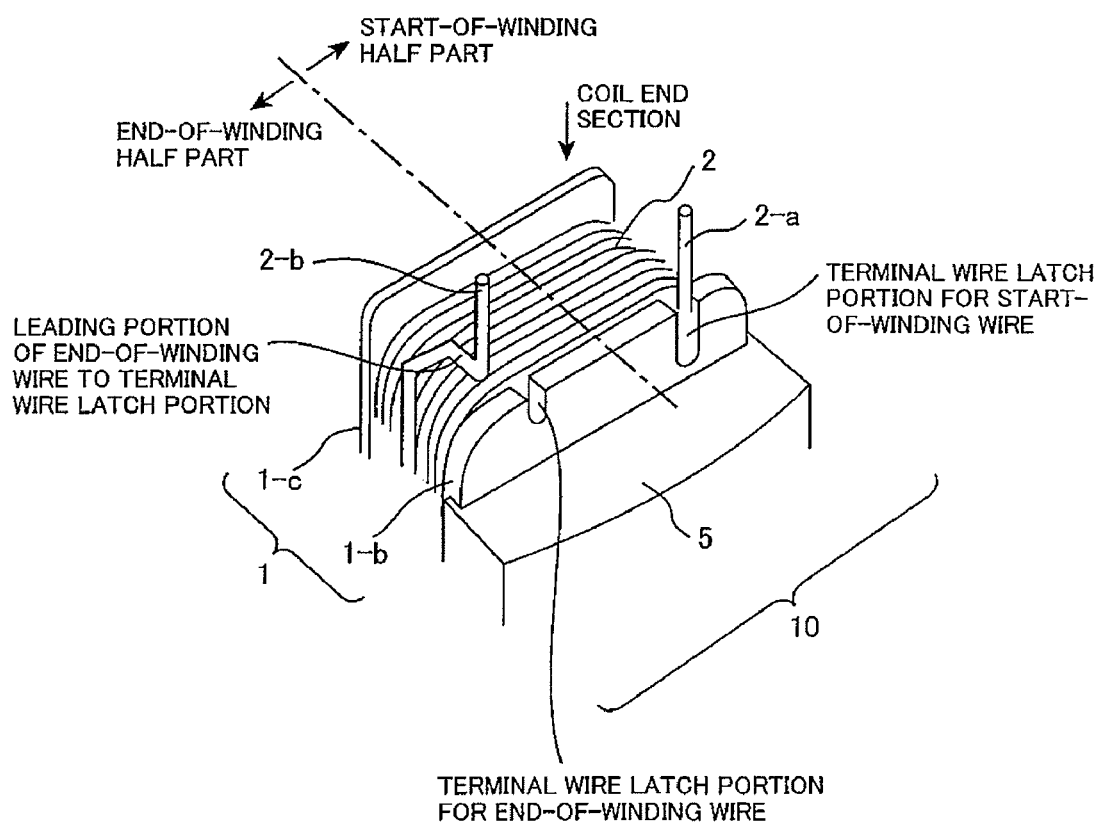
FIG. 15 is a schematic illustration showing a perspective view of a coil end section of a concentrated winding coil wound on a bobbin according to a fourth embodiment of the present invention.

FIG. 15 is a schematic illustration showing a perspective view of a coil end section of a concentrated winding coil wound on a bobbin according to a fourth embodiment of the present invention. As shown in FIG. 15, a start-of-winding wire, an end-of-winding wire, and terminal wire latch portions can be seen.

In the conventional winding method, because a wire 2 is not directly held during the winding, the wire tends to become slack and drift while handling for a terminal wire is executed. For this reason, it was difficult to lead the end-of-winding wire 2-b to out of the coil directly from a terminal wire latch portion disposed in an end-of-winding half part on the coil end side viewed from the coil end. Therefore, in the case that the end-of-winding wire 2-b is led out through the terminal wire latch portion disposed in the end-of-winding half part on the coil end side due to a reason of designing of the terminal wire, the wire has to be led once to a start-of-winding half part (an opposite half part to the end-of-winding half part) on the coil end side in order to suppress slack and drift, and then has to be returned to the end-of-winding half part and be latched at the terminal wire latch position for the end-of-winding wire. In other words, a leading portion of the end-of-winding wire to the terminal wire latch portion must be positioned in the start-of-winding half part on the coil end viewed from the coil end.

On the contrary, according to the present invention, it is possible to prevent the wire from becoming slack and drift by directly holding the wire 2 with the wire guiding/holding member while handling for the terminal wire is executed. As a result, it is possible to lead the end-of-winding wire 2-b directly to the terminal wire latch portion for the end-of-winding wire disposed in the end-of-winding half part on the coil end side viewed from the coil end, as shown in FIG. 15. It means that the leading portion of the end-of-winding wire to the terminal wire latch portion can be also positioned in the end-of-winding half part on the coil end side viewed from the coil end. By doing so, limitations to the designing of the terminal wire can be reduced, thereby increasing the degree of flexibility of design.

As stated above, the concentrated winding coil according to the present invention can shift all turns and all coil layers only on the coil end side, therefore maintaining a wire alignment condition of the coil, especially in the slot section inserted into a stator core. Furthermore, in the coil winding method of the present invention, a wire guiding/holding mechanism is disposed in the vicinity of a winding bobbin, and the wire guiding/holding mechanism stands ready at a position, which has a space with regard to the width of the wire, to guide the position of the wire before the wire is wound around the bobbin, and the wire guiding/holding mechanism then applies a pressing force onto the wire after the wire has been wound around. Thus, it is possible to prevent the disturbance in alignment of the coil wire and to provide a coil having a high slot-fill rate, thereby contributing to the increase in efficiency of an electric motor and the reduction of the motor size. Furthermore, according to the present invention, the wire guiding/holding member can position a wire inside the bobbin, thereby preventing the disturbance in alignment of the coil wire and enabling highly accurate winding. Herein, "inside the bobbin" means a space around the bobbin body and between the inner flange and the outer one.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A concentrated winding coil, the coil having a rectangle shape having a long side as a coil slot section and a short side as a coil end section viewed from a coil axis direction of the coil, comprising:
   a plurality of coil layers each of which is composed of a plurality of wire turns wound in alignment winding; and
   a bobbin including an inner flange, an outer flange and a bobbin body on which the wire is wound and which has no guide grooves, the bobbin body having a rectangle shape having a long side for the coil slot section and a short side for the coil end section viewed from the coil axis direction,
   wherein: each of the coil layers includes a turn shift section where the wire is shifted from an n-th turn to an (n+1)-th turn by wire traverse which is a wire displacement along the coil axis direction and a non-traverse section where the wire traverse is not executed;
   the turn shift section is located only on a side of the coil end section;
   the non-traverse section is located on both sides of the coil slot section and the other side of the coil end section;
   each of the coil layers includes a layer shift section where the wire is shifted from an m-th coil layer to an (m+1)-th coil layer;
   the layer shift section is located only on the coil end side including the turn shift section, and
   wherein: on the coil end side including the turn shift section are located a start-of-winding wire of the coil, an end-of-winding wire of the coil, a terminal wire latch portion for the start-of-winding wire, and a terminal wire latch portion for the end-of-winding wire;
   the terminal wire latch portion for the start-of-winding wire is arranged on an extension line along the long side of the bobbin body such that the start-of-winding wire goes straight into a first turn in the coil slot section; and
   the end-of-winding wire is led directly to the terminal wire latch portion for the end-of-winding wire.

2. An electrical rotating machine comprising the concentrated winding coil according to claim 1.

3. The concentrated winding coil according to claim 1, wherein:
   the wire is a round wire or a rectangular wire.

4. The concentrated winding coil according to claim 1, wherein:
   a clearance between a length of the bobbin body in a coil axis direction and a length of the coil layer in the same direction is shorter than a width of the wire.

5. The concentrated winding coil according to claim 1, wherein:
   a number of turns on each layer is not the same.

6. The concentrated winding coil according to claim 1, wherein:
   said side is one side which is located on the coil end section of the bobbin.

7. The concentrated winding coil according to claim 1, wherein:
   in the same half part on the coil end side viewed from the coil end are positioned the end-of-winding wire, the terminal wire latch portion for the end-of-winding wire, and a leading portion of the end-of-winding wire to the terminal wire latch portion.

8. The concentrated winding coil according to claim 1, wherein:
   through the coil slot section, each of turns of a second and after coil layers are located just right on the corresponding turns of a first coil layer.

9. The concentrated winding coil according to claim 1, wherein:
   the start-of-winding wire is lead directly to the terminal wire latch portion for the start-of-winding wire.

10. A concentrated winding coil, the coil having a rectangle shape having a long side as a coil slot section and a short side as a coil end section viewed from a coil axis direction of the coil, comprising:
    a plurality of coil layers each of which is composed of a plurality of wire turns wound in alignment winding; and
    a bobbin including an inner flange, an outer flange and a bobbin body on which the wire is wound and which has no guide grooves, the bobbin body having a rectangle shape having a long side for the coil slot section and a short side for the coil end section viewed from the coil axis direction,
    wherein: each of the coil layers includes a turn shift section where the wire is shifted from an n-th turn to an (n+1)-th turn by wire traverse which is a wire displacement along the coil axis direction;
    the turn shift section is located only on one side of the coil end section;
    on the other side of the coil end section and both sides of the coil slot section, the wire is wound parallel to the inner and outer flanges, and
    wherein: on the coil end side including the turn shift section are located a start-of-winding wire of the coil, an end-of-winding wire of the coil, a terminal wire latch portion for the start-of-winding wire, and a terminal wire latch portion for the end-of-winding wire;
    the terminal wire latch portion for the start-of-winding wire is arranged on an extension line along the long side of the bobbin body such that the start-of-winding wire goes straight into a first turn in the coil slot section; and
    the end-of-winding wire is led directly to the terminal wire latch portion for the end-of-winding wire.

11. The concentrated winding coil according to claim 10, wherein:
    the start-of-winding wire is lead directly to the terminal wire latch portion for the start-of-winding wire.

* * * * *